United States Patent
Aoyama et al.

(10) Patent No.: US 6,483,322 B2
(45) Date of Patent: Nov. 19, 2002

(54) CAPACITIVE PHYSICAL QUANTITY SENSOR

(75) Inventors: Seiki Aoyama, Toyohashi (JP); Shigenori Yamauchi, Nisshin (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/901,606

(22) Filed: Jul. 11, 2001

(65) Prior Publication Data

US 2002/0011108 A1 Jan. 31, 2002

(30) Foreign Application Priority Data

Jul. 25, 2000 (JP) ........................................ 2000-224085

(51) Int. Cl.[7] .............................................. G01P 15/08
(52) U.S. Cl. ...................... 324/661; 324/679; 73/514.32
(58) Field of Search ................................ 324/160, 162, 324/163, 168, 661, 679, 672; 73/514.32, 1.38; 327/94, 96, 337, 344

(56) References Cited

U.S. PATENT DOCUMENTS 5,325,065 A * 6/1994 Bennett et al. ............. 324/661
5,465,604 A * 11/1995 Sherman ..................... 73/1.38
5,473,946 A * 12/1995 Wyse et al. ............... 73/514.18
5,612,494 A * 3/1997 Shibano .................... 73/514.18
5,633,594 A  5/1997 Okada
5,751,154 A * 5/1998 Tsugai ....................... 324/661
5,812,427 A * 9/1998 Nonoyama et al. ......... 324/166
6,257,061 B1  7/2001 Nonoyama et al.

FOREIGN PATENT DOCUMENTS

| JP | A-60-48611 | 3/1985 |
| JP | A-8-145717 | 6/1996 |
| JP | A-2000-81449 | 3/2000 |

* cited by examiner

*Primary Examiner*—N. Le
*Assistant Examiner*—Vincent Q. Nguyen
(74) *Attorney, Agent, or Firm*—Law Offices of David G. Posz

(57) ABSTRACT

The clock signal for the sample and hold circuit for sampling the C-V conversion circuit output generated by the control signal generation circuit is different in period from the clock signal for switched capacitor filter circuit for filtering the sample and hold circuit output such that the clock signal for the switched capacitor filter circuit is unchanged in period between the measuring and self-diagnostic modes.

8 Claims, 7 Drawing Sheets

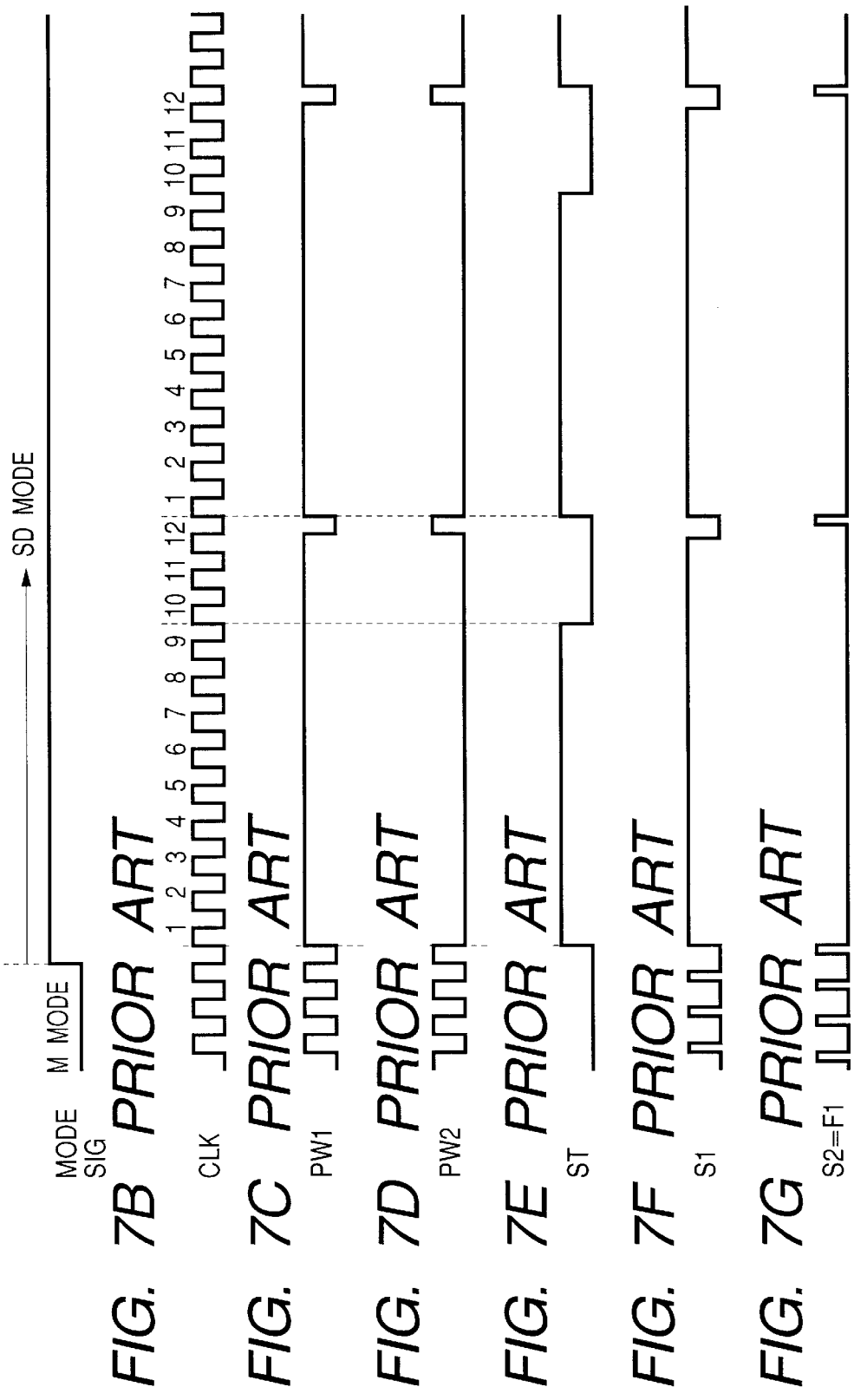

CAPACITIVE PHYSICAL QUANTITY SENSOR

BACKGROUND OF THE INVENTION

1. Field of the Invention

This invention relates to a capacitive physical quantity sensor.

2. Description of the Prior Art

An acceleration sensor using a capacitive physical quantity sensor for detecting acceleration thereto is known. Recent acceleration sensors require a filter circuit in the signal processing circuit provided thereto for processing the signal from the sensor portion. Moreover, the filter circuit is required to have a low cutoff frequency so as to provide a low frequency range (for example, 10 to 10 KHz). This is because the acceleration signal is required to have a frequency range from zero (dc) to hundreds Hz, but a resonance frequency of the structure of the sensor exists at from hundreds to thousands Hz. This resonance frequency component should be removed. For this, a switched capacitor filter circuit (SFC circuit) is used. Moreover, the switched capacitor filter needs a relatively small area in the signal processing circuit and easily provides a low frequency range.

The SCF circuit includes analog switches comprising CMOS transistors and operational amplifiers and is miniaturized by a CMOS processing. The cutoff frequency of the SCF circuit is determined by a ratio of capacitances in the SCF circuit and a frequency of a clock signal for controlling switches in the SCF circuit.

If the signal processing circuit including such a switched capacitor filter circuit generates the clock signals for sampling and holding the voltage signal from the sensor and the clock signal for the switched capacitor filter circuit, generally, the clock signals for the sample and hold circuit should be in phase with the carrier signals for the sensor. If these signals are out of phase, the sensor may erroneously operate or the accuracy of the sensor output may decrease because of mutual clock noises.

The inventors disclosed a capacitive physical quantity sensor having a self-diagnostic function for diagnosing whether the sensor output is accurate in Japanese patent application provisional publication NO. 10-185083. FIG. 6 is a block diagram of this prior art capacitive physical quantity sensor.

This prior art sensor includes a sensor element 110 including movable electrodes 101a and 101b and fixed electrodes 102a and 102b and a detection circuit 120 for detecting acceleration on the basis of the difference capacitances between the movable electrode 101a and the fixed electrode 102a and between the movable electrode 101b and the fixed electrode 102b. The detection circuit 120 includes a C-V conversion circuit 121, a switch circuit 122, a sample and hold circuit 123, an SCF circuit 124, and a control signal generation circuit 125 for generating clock signals. The C-V conversion circuit 121 converts variation in the difference capacitance of the movable electrodes 101a and 101b and the fixed electrodes 102a and 102b. Next, the sample and hold circuit 123 samples and holds the sensor output. The SCF circuit 124 filters the sampled sensor output.

FIGS. 7A to 7G are timing charts of signals for self-diagnosis in the prior art sensor.

In FIGS. 7A to 7G, the carrier signals PW1 and PW2 supplied to the fixed electrodes 102a and 102b, a switch signal ST for switching the reference voltage, a signal S1 for switch 121c, and the circuit clock S2 for the sample and hold circuit 123 and SCF circuit 124 are changed in the period between the measuring (M) mode and the self-diagnostic (SD) mode. That is, the circuit clock S2 for the switched capacitor filter circuit 124 is commonly used in sample and hold circuit 123. Accordingly, the circuit clock S2 for the switched capacitor filter circuit 124 is varied between the measuring and self-diagnostics modes.

SUMMARY OF THE INVENTION

The aim of the present invention is to provide a superior capacitive physical quantity sensor.

According to the present invention, a first aspect of the present invention provides a capacitive physical quantity sensor comprising: first and second variable capacitors, each including a movable electrode and a fixed electrode facing each other, capacitances of said first and second variable capacitors varying in accordance with a physical quantity on said movable electrode; signal generation means for periodically supplying carrier signals to said fixed electrodes to measure variation in differential capacitance of said first and second variable capacitors at a first period in a measuring mode and at a second period in a self-diagnostic modes and generating a displacement signal for displacing said movable electrode at said second period in said self-diagnostic mode; and a signal processing circuit including: a C-V conversion circuit for converting a charge signal indicative of said differential capacitance into a voltage signal; and a switched capacitor filter circuit for filtering said voltage signal to output a filtered voltage signal in response to a filter circuit clock signal, wherein said signal generation means further generates said filter circuit clock signal in said measuring and self-diagnostic modes at the same period, and said first period is different from said second period.

According to the present invention, a second aspect of the present invention provides a capacitive physical quantity sensor based on the first aspect, wherein said signal processing circuit further comprises a sample and hold circuit for sampling and holding said voltage signal in response to a sample and holding clock signal which is different from said filter circuit clock signal in period.

According to the present invention, a third aspect of the present invention provides a capacitive physical quantity sensor based on the first aspect, wherein said signal processing circuit further comprises a sample hold circuit for sampling and holding said voltage signal in response to a sample and holding clock signal of which period is different between said measuring and self-diagnostic modes.

According to the present invention, a fourth aspect of the present invention provides a capacitive physical quantity sensor based on the second aspect, wherein said signal generation means further generates said sampling and holding clock signal and said filter circuit clock signal and further includes synchronizing means for synchronously outputting said sampling and holding clock signal and said filter circuit clock signal.

According to the present invention, a fifth aspect of the present invention provides a capacitive physical quantity sensor based on the third aspect, wherein said signal generation means further generates said sampling and holding clock signal and said filter circuit clock signal and further includes synchronizing means for synchronously outputting said sampling and holding clock signal and said filter circuit clock signal.

According to the present invention, a sixth aspect of the present invention provides a capacitive physical quantity sensor based on the fourth aspect, wherein said signal generation means includes a programmable counter circuit for generating said carrier signals at said first period and said second period in said measuring and self-diagnostic modes, respectively.

According to the present invention, a seventh aspect of the present invention provides a capacitive physical quantity sensor based on the fifth aspect, wherein said signal generation means includes a programmable counter circuit for generating said carrier signals at said first period and said second period in said measuring and self-diagnostic modes, respectively.

According to the present invention, an eighth aspect of the present invention provides a capacitive physical quantity sensor based on the first aspect, wherein said signal generation means includes an oscillator for generating a reference clock signal; a counter circuit responsive to said reference clock signal for generating said filter circuit clock signal with the same dividing ratio in said measuring and self-diagnostic modes; a programmable counter circuit responsive to the reference clock signal for generating said sample and hold clock signal, and said clock signal in said measuring mode and self-diagnostic mode with different dividing ratios, respectively.

BRIEF DESCRIPTION OF THE DRAWINGS

The object and features of the present invention will become more readily apparent from the following detailed description taken in conjunction with the accompanying drawings in which:

FIGS. 7A to 7G are timing charts of signals for self-diagnosis in the prior art sensor.

The same or corresponding elements or parts are designated with like references throughout the drawings.

DETAILED DESCRIPTION OF THE INVENTION

FIRST EMBODIMENT

Figure 1:
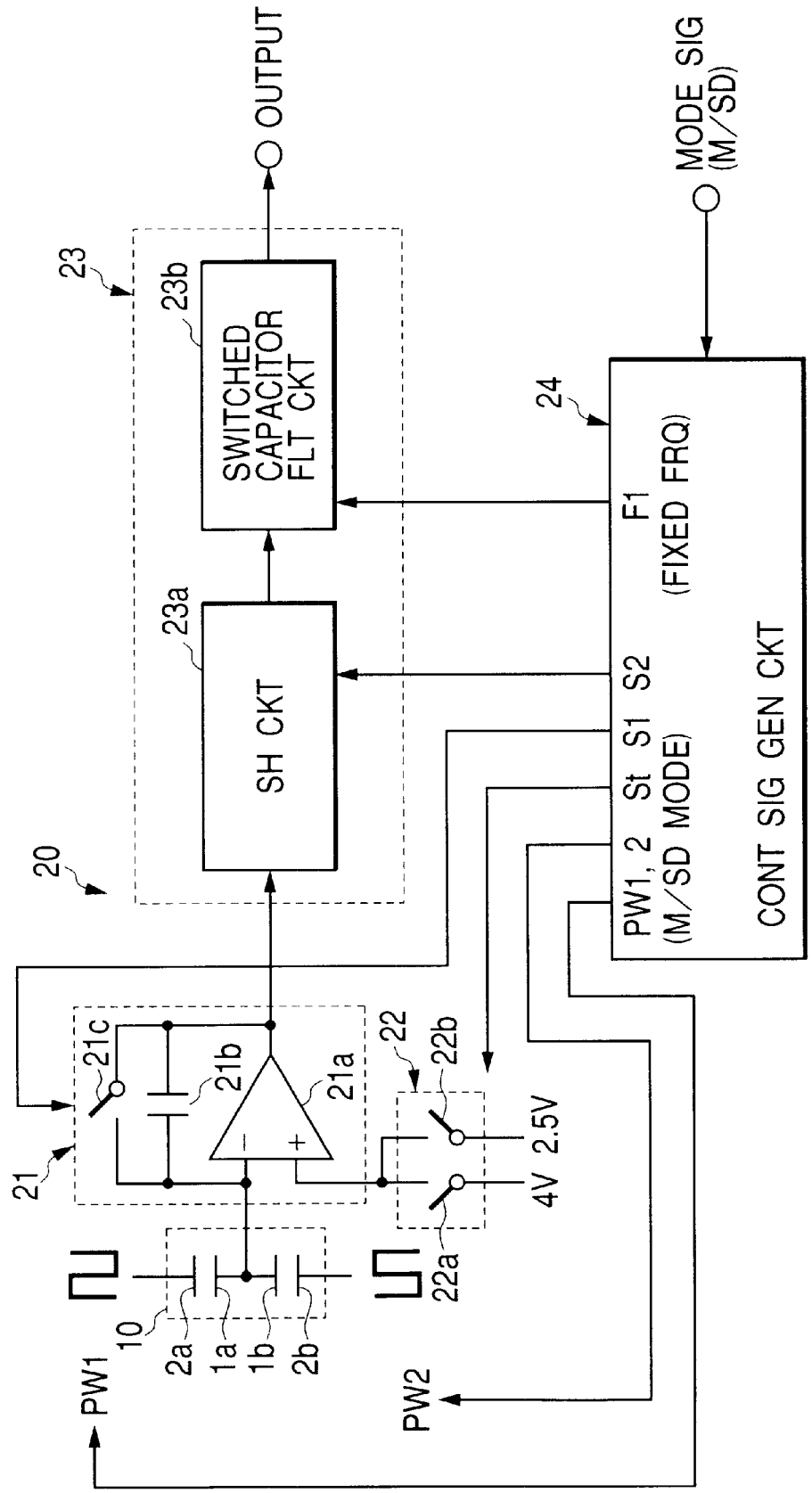
FIG. 1 is a block diagram of a capacitor type of acceleration sensor including a capacitive physical quantity sensor according to an embodiment he present invention.

FIG. 1 shows a block diagram of a capacitor type of acceleration sensor including a capacitive physical quantity sensor according to the first embodiment of the present invention.

The acceleration sensor includes a sensor element 10 having movable electrodes 1a and 1b and fixed electrodes 2a and 2b, and a detection circuit 20 for detecting acceleration on the basis of a variation in the difference capacitance in the sensor element 10.

The sensor element 10 has a bridge structure (not shown) on a substrate (not shown) for detecting acceleration. One ends of the movable electrodes 1a and 1b are fixed to the bridge structure, and the fixed electrode 2a and 2b are fixed on the substrate as to face the movable electrodes 1a and 1b. In this embodiment, two movable electrodes 1a and 1b are provided. However, only one movable electrode may be provided and commonly used between a pair of fixed electrodes 2a and 2b.

The movable electrodes 1a and the fixed electrode 2a and the movable electrode 1b and the fixed electrode 2b are capable of providing difference in capacitances of these variable capacitors, and voltages V having inverting relation therebetween are periodically applied to fixed electrodes 2a and 2b as carrier signals PW1 and PW2. This provides detection of acceleration on the basis of the differential capacitance variation representing displacement of the movable electrodes 1a and 1b.

The detection circuit 20 includes a C-V conversion circuit 21, a switch circuit 22, a signal processing circuit 23, and a control signal generation circuit 24.

The C-V conversation circuit 21 converts variation in the differential capacitance in the sensor element 10 into a voltage signal, and includes an operational amplifer 21a, a capacitor 21b, and a switch 21c. The inverting input of the operational amplifier 21a is connected to the movable electrodes 1a and 1b. Between the inverting input and output of the operational amplifier 21a, a capacitor 21b and a switch 21c are connected, wherein the capacitor 21b is in parallel to the switch 21c.

The switch 21c is driven by a signal S1 from the control signal generation circuit 24. The non-inverting input of the operational amplifier 21a is supplied with either of a half voltage V/2 of the voltage V applied to the fixed electrodes 2a and 2b as a center voltage V/2 (2.5 V in this embodiment), or a voltage which is different from the center voltage (4 V in this embodiment) as an offset voltage.

The switch circuit 22 includes switches 22a and 22b to supply the center voltage V/2 or the offset voltage to the non-inverting input of the operational amplifier 21a from not-shown voltage sources. The switches 22a and 22b are driven by a signal ST from the control signal generation circuit 24, wherein one of them is closed when the other is open.

The signal processing circuit 23 includes a sample and hold circuit 23a and a switched capacitor filter (SCF) circuit 23b. The sample and hold circuit 23 is driven by a sample and hold circuit clock signal S2 from the control signal generation circuit 2 to sample and hold the output of the C-V conversion circuit 21 for a predetermined interval. The SCF circuit 23b is driven by a signal F1 from the control signal generation circuit 24 to output only necessary frequency band components from the output voltage of the sample and hold circuit 23a.

The control signal generation circuit 24 generates the carrier signals PW1 and PW2 indicating timings of applying the voltage V to the fixed electrodes 2a and 2b, the signal ST indicating the timing of switching the switch circuit 22, the signal S1 indicating the timing of switching the switch 21c, the sample and hold circuit clock signal S2 indicating the timing of sampling and holding for the sample and hold circuit 23a, and the filter circuit clock signal F1 for the SCF circuit 23b. Out of these signals generated by the control signal generation circuit 24, signals PW1, PW2, ST, S1, and S2 are changed in period between a measuring mode (acceleration measuring mode) and a self-diagnostic mode.

Figure 2:
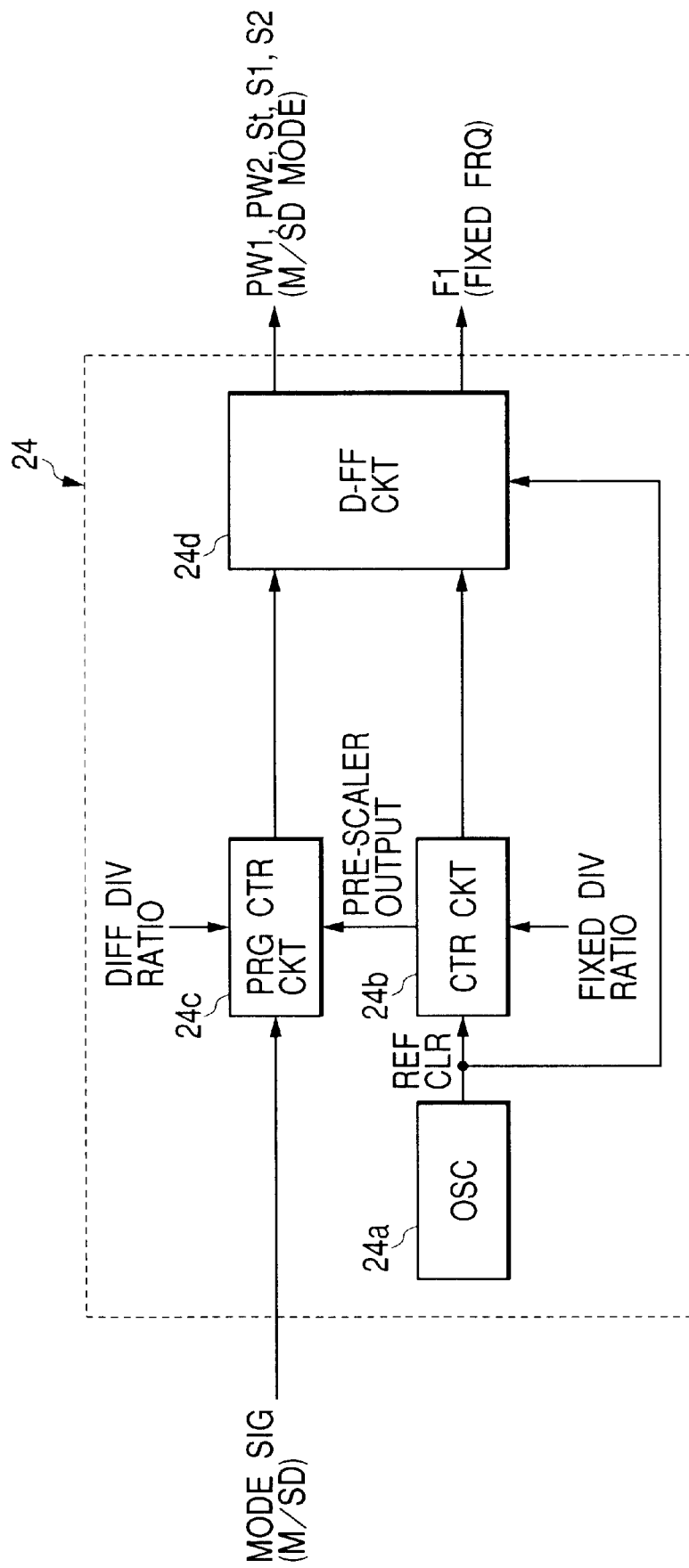
FIG. 2 is a partial block diagram of the control signal generation own in FIG. 1.

FIG. 2 is a partial block diagram of the control signal generation circuit 24. The control signal generation circuit 24 includes an oscillator 24a for generating a reference clock signal, a counter 24b for counting the reference clock signal with a fixed dividing ratio to output a fixed frequency signal, a programmable counter 24c for counting the reference clock signal through a prescaler in the counter circuit 24b, and a D-FF circuit 24d for synchronously output the program counter circuit 24c and the output of the counter 24b as the signals Pw1, Pw2, ST, S1, S2, and F1 in response to the reference clock signal from the oscillator 24a. The oscillator 24a, the counter circuit 24b and the D-FF circuit generates the filter circuit clock signal F1 of which period is unchanged between the measuring and self-diagnostic modes and is supplied to the SCF circuit 23b, so that the cutoff frequency of the SCF circuit 23b is unchanged between the measuring and self-diagnostic modes. On the other hand, the programmable counter circuit 24c and the D-FF circuit 24d generates the signals PW1, PW2, ST, S1, and S2 of which periods are changed between the measuring and self-diagnostic modes.

The programmable counter circuit 24c can directly counts the reference clock signal. However, in the above-mentioned structure, the prescaler in the counter circuit 24b is commonly used for generating the signal F1 and the signals PW1, PW2, ST, S1, and S2 to reduce the number of the prescalers.

Figure 3:
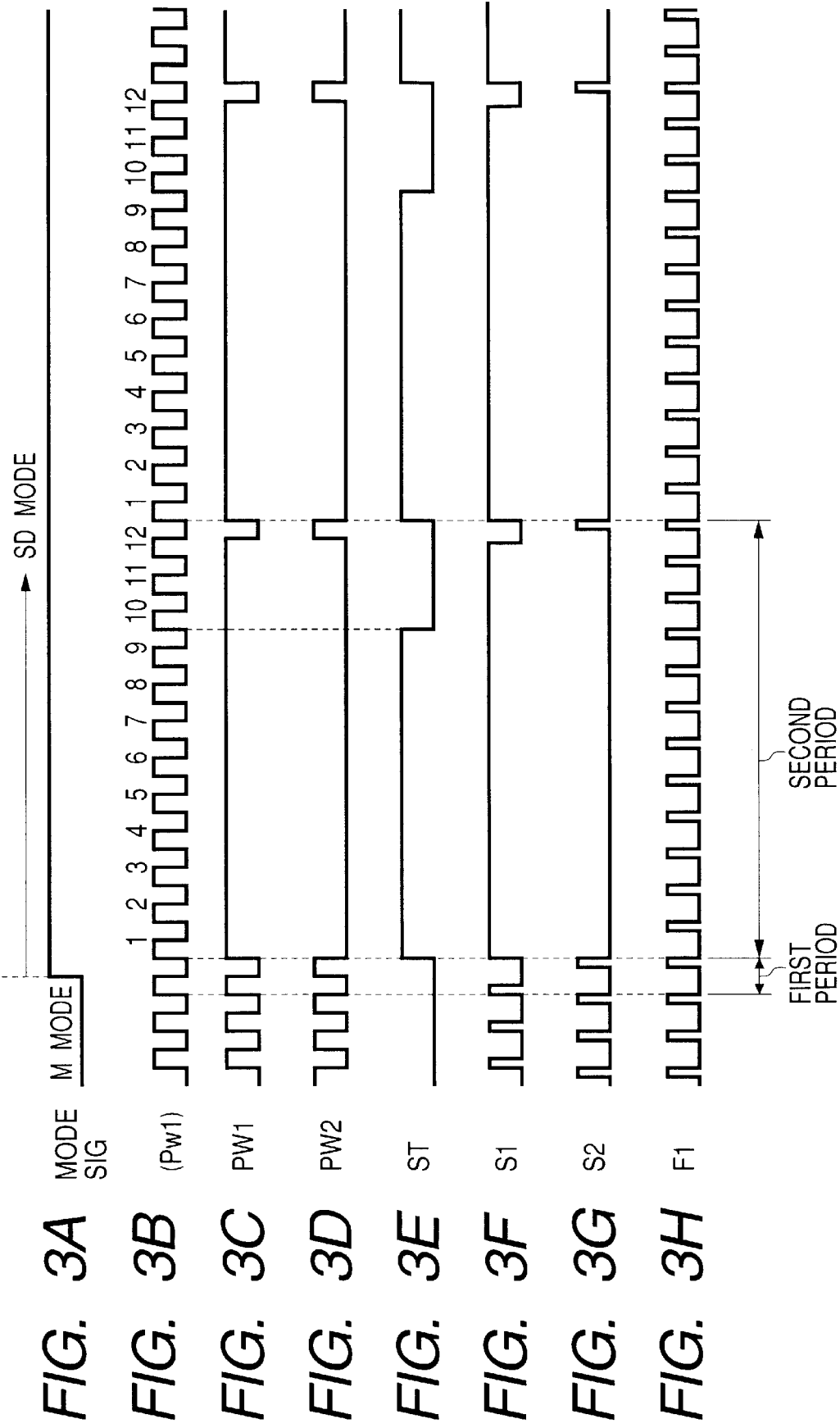
FIGS. 3A to 3H, 4A to 4F, and 5A to 5F show waveforms of the signals from the control signal generation circuit.
Figure 4:
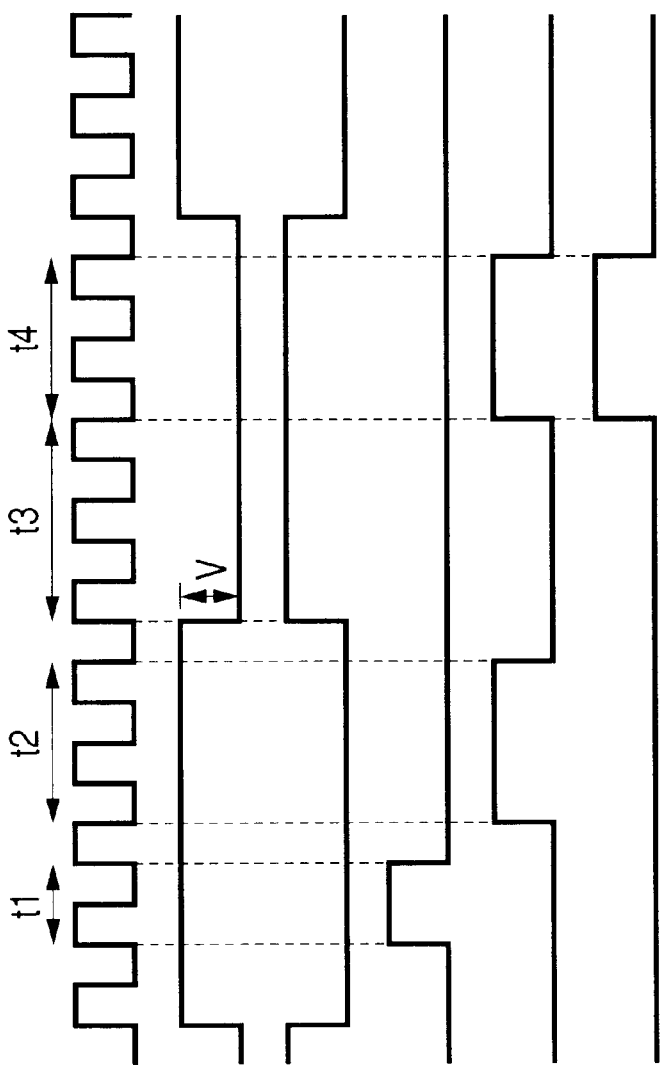

FIGS. 3A to 3H, 4A to 4F, and 5A to 5F show waveforms of the signals from the control signal generation circuit 24. FIG. 3 shows switching of the signal conditions from the measuring mode to the self-diagnostic mode. FIGS. 4A to 4F show enlarged views of signal conditions in the measuring mode. FIGS. 5A to 5F further show operation in the sensor element 10 in the self-diagnostic operation.

At first, the operation in the acceleration measuring mode will be described with reference to FIGS. 4A to 4F. In this mode, though the signal ST is not shown in FIGS. 4A to 4F, the signal ST keeps L to supply the center voltage 2/V (2.5 V in this embodiment) to the non-inverting input in order to supply the center voltage 2/V to the movable electrodes 1a and 1b through the C-V conversation circuit 21.

The carrier signals PW1 and PW2 have rectangular waves at 50% duty and an inverted relation therebetween, wherein the level of H is V (5 V) and the level of L is 0 V in this embodiment.

At the interval t1, the potential of the fixed electrode 1a is 5V and that of the fixed electrode 1b is 0 V with the carrier signals Pw1 and PW2. At the same time, the switch 21c is closed in response to the signal S1 from the control signal generation circuit 24. This provides a bias voltage V/2 to the movable electrodes 1a and 1b and discharges the capacitor 21b.

In this condition, if there is a relation of the capacitance C1 between the movable electrode 1a and the fixed electrode 2a with the capacitance C2 between the movable electrode 1b and the fixed electrode 2b is C1>C2, the movable electrodes 1a and 1b hold larger amounts of negative charges because of this relation and the voltages applied to the fixed electrodes 2a and 2b.

At the interval t2, the carrier signal PW1 makes the potential of the fixed electrode 2a V, and the carrier signal PW2 makes the potential of the fixed electrode 2b 0V, and the switch 21c is opened in response to the signal S1. This charges the capacitor 21b with charges corresponding to the conditions of the movable electrodes 1a and 1b. The voltage corresponding to the charge held in the capacitor 21b is converted by the C-V conversion circuit 21 into a voltage signal which is sampled and held by the sample and hold circuit 23a in response the signal S2.

At the interval t3, the carrier signal PW1 makes the potential of the fixed electrode 2a 0V, and the carrier signal PW2 makes the potential of the fixed electrode 2b V (5 V), and the switch 21c is kept open in response to the signal S1. That is, the potentials at the fixed electrodes 2a and 2b are exchanged from the previous condition.

Then, the condition of charges at the movable electrodes 1a and 1b are reversed from the condition of charges at the second interval t2. That is, if three is the relation C1>C2, the movable electrodes 1a and 1b hold larger amounts of positive charges than fixed electrodes 2a and 2b as the result of inverting in the applied potentials to the fixed electrodes 2a and 2b.

This charge is stored in the capacitor 21b. Then, the capacitor 21b is charged by the difference in the amounts of charges generated in the first and third intervals. The C-V conversion circuit 21 converts this charge in the capacitor 21b into the voltage which is proportional to the amount of the charges and inversely proportional to the capacitance C from the relation of Q=CV.

Moreover, at the fourth period t4, that is, the output voltage of the C-V conversion circuit 21 has been stabilized, the sample and hold circuit 23a samples and holds the output voltage of the C-V conversion circuit 21.

The SCF circuit 23b executes differential operation between the voltage sampled at the second interval t2 and the voltage sampled at the fourth interval t4 to cancel the thermal characteristic in the switching noise in the sampling operation and the 1/f noise of the operational amplifer, an offset voltage and its thermal characteristic or the like to output the necessary frequency component. The output of the SCF circuit 23b indicates the detected acceleration.

Next, the self-diagnostic operation will be described with reference to FIGS. 5A to 5F.

The control signal generation circuit 24 is supplied with a mode signal indicative of ether of the measuring (M) mode or a self-diagnostic (SD) mode. When the mode signal indicating the self-diagnostic operation is inputted to the control signal generation circuit 24, the programmable counter circuit 24c generates the signals PW1, PW2, ST, S1, and S2 at a period which is longer than that in the measuring mode. On the other hand, the counter circuit 2b generates the signal F1 at the same frequency as that in the measuring mode with the same dividing ratio.

The carrier signals PW1 and PW2 provide a voltage difference between the fixed electrodes 2a and 2b. The signal ST makes the switch 22a open and the switch 22b close, so the non-inverting input of the operational amplifier 21a is supplied with the offset voltage (4V in this embodiment) which is different from the center voltage V/2.

This makes voltage difference (1 V) between the movable electrode 1a and the fixed electrode 2a greater than the voltage difference (4 V) between the movable electrode 1b and the fixed electrode 2b. This unbalance in electrostatic forces displaces (shifts) the movable electrodes 1a and 1b from their center position as offset.

Figure 5:
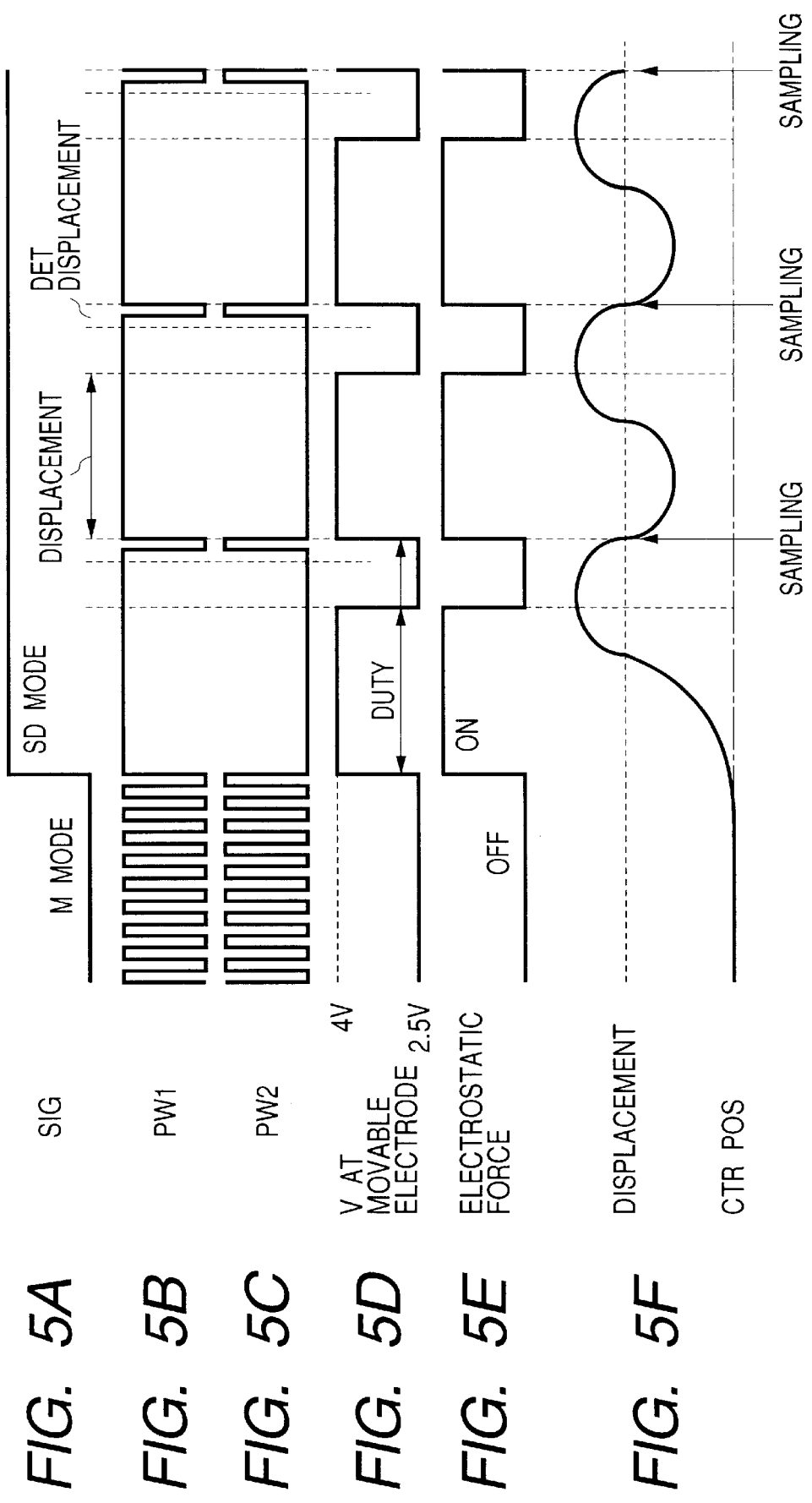
Figure 6:
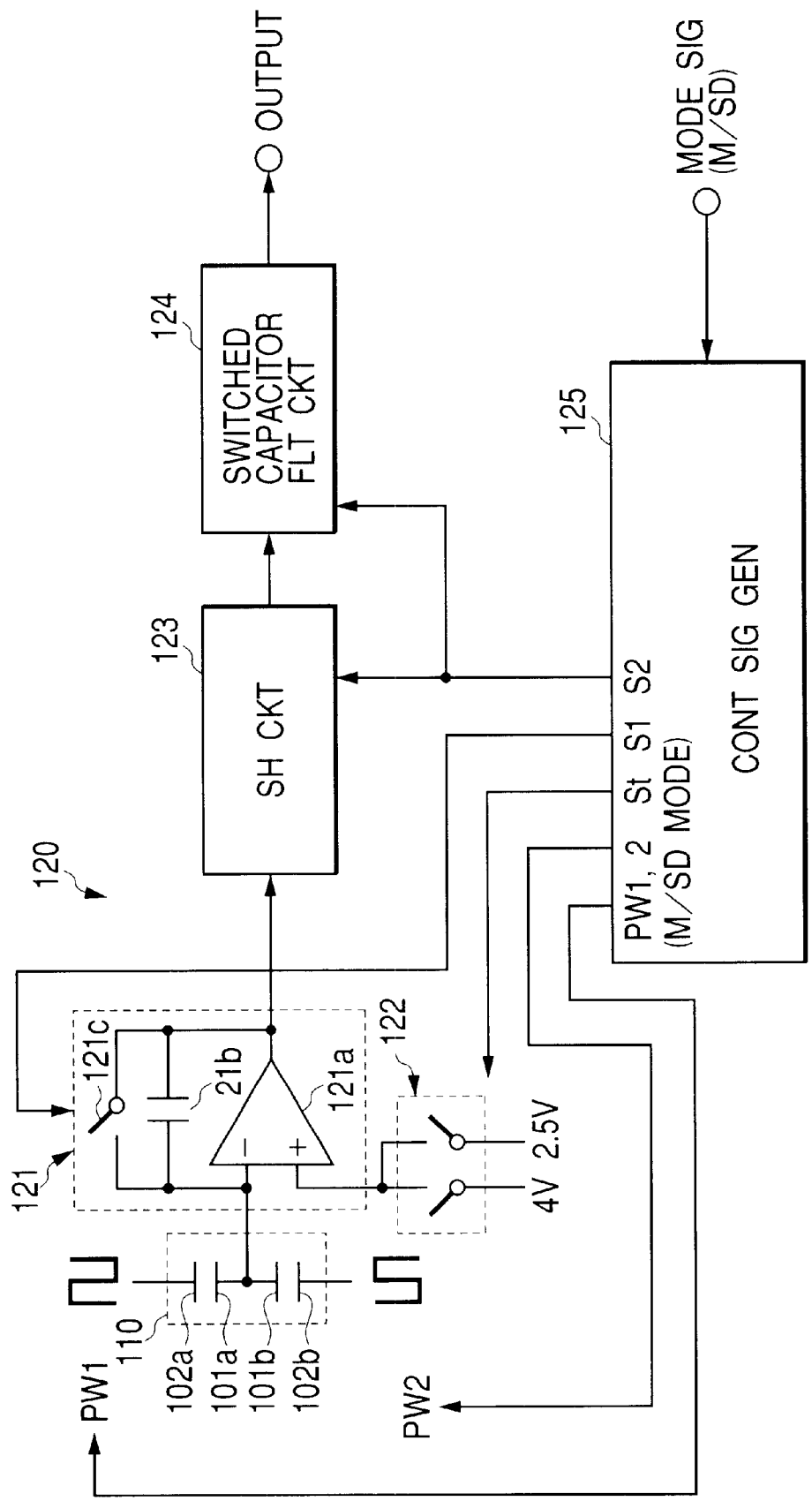
FIG. 6 is a block diagram of this prior art capacitive physical quantity sensor.

The period of the signal ST is determined as to obtain a sufficient displacement of the movable electrodes 1a and 1b at the timing for detecting the displacement amount of the movable electrodes 1a and 1b (FIG. 5F). That is, the interval generating the electrostatic forces in this condition is controlled by the period of the signal ST as shown in FIG. 5E. The electrostatic forces is periodically generated by the signal ST at a predetermined duty, so the movable electrodes 1a and 1b are displaced stably at the sampling timings as shown in FIG. 5F.

Next, the signal ST switches the switch circuit 22 to supply the center voltage V/2 to the non-inverting input of the operational amplifier 21a in the same manner as the measuring mode.

Next, the measuring operation is effected in the same manner as that in the measuring mode to obtain the output of the signal processing circus 23 indicative of the displacement of the movable electrodes 1a and 1b. The displacement is uniquely defined by the voltage applied to the movable electrodes 1a and 1b in above-mentioned condition. Hence, comparing the output of the signal processing circuit in the self-diagnostic mode with experimentally or theoretically obtained value provides a result of the self-diagnostic of the sensor element 10. If the output of the signal processing circuit disagrees with the experimentally or theoretically obtained value, an erroneous condition is judged. If the output of the signal processing circuit agrees with the experimentally or theoretically obtained value, the condition of the sensor element 10 is judged to be normal.

In the self-diagnostic operation, the filter circuit clock signal F1 for the SCF circuit 23b is independent from the signal S2. That is, the filter circuit clock signal F1 is unchanged between the acceleration measuring mode and the self-diagnostic mode, so the cutoff frequency of the SCF circuit 23b is unchanged.

That is, if it is assumed that the fundamental frequency is A, which corresponds one period of the basic clock signal, the filter constant of the SCF circuit 23b is set to the cutoff frequency which is Z times A (fc=ZA[Hz]) in the both of the measuring and self-diagnostic modes. In other words, the cutoff frequency and the signal F1 are unchanged though the period of the carriers (signals PW1 and PW2) is made longer in the self-diagnostic mode.

This structure does not change the cutoff frequency of the SCF circuit 23b though the self-diagnostic operation is effected. The cutoff frequency of the SCF circuit is determined by a ratio of capacitances in the SCF circuit and a frequency of a clock signal for controlling switches in the SCF circuit. Therefore, because of the same cutoff frequency, it is sufficient that the capacitance of a capacitor in the SCF circuit is unchanged, so that the interval necessary for stabilizing the SCF circuit 23b is also unchanged, so a sufficient filtering function is provided to output an accurate detection signal at the desired frequency region.

The D-FF circuit 24d synchronously outputs the signals PW1, PW2, ST, S1, and S2 with the filter circuit clock signal F1. Hence, the SCF circuit 23b is operated in phase with the other circuits. This structure eliminates affection of timing deviation from the other circuits.

As mentioned above, the capacitive physical quantity sensor includes: first and second variable capacitors (C1 and c2), each including the movable electrode 1a or 1b and the fixed electrode 2a or 2b facing each other, capacitances C1 and C2 of the first and second variable capacitors being substantially equivalent to each other when there is no physical quantity on the movable electrodes and varying in accordance with a physical quantity (acceleration or the like) on the movable electrode 1a and 1b; the control signal generation circuit 24 for periodically supplying carrier signals PW1 and PW2 to the fixed electrodes 2a and 2b to measure variation in differential capacitance (C1–C2) of the first and second variable capacitors at the first period in the measuring (M) mode and at the second period in the self-diagnostic (SD) modes and generating the displacement signal (4 V) for displacing the movable electrodes 1a and 1b at the second period in the self-diagnostic mode; and the signal processing circuit 20 including: the C-V conversion circuit 21 for converting the charge signal indicative of the differential capacitance into the voltage signal; and the switched capacitor filter circuit 23b for filtering the voltage signal to output the filtered voltage signal in response to the filter circuit clock signal F1, wherein the signal generation circuit 23 further generates the filter circuit clock signal F1 in the measuring and self-diagnostic modes at the same period, and the first period is different from the second period.

The signal generation circuit 24 includes the oscillator 24a for generating the reference clock signal REF cLK; the counter circuit 24b responsive to the reference clock signal REF CLK for generating the filter circuit clock signal F1 with the same dividing ratio in the measuring and self-diagnostic modes; a programmable counter circuit 24c for generating the sample and hold clock signal S2, and the carrier signals PW1 and PW2 in the measuring mode and self-diagnostic mode with different dividing ratios, respectively.

MODIFICATIONS

In the above-mentioned embodiment, the acceleration sensor is described as the capacitive physical quantity sensor. However, this capacitive physical quantity sensor is applicable to other sensors such as a pressure sensor or yaw rate sensor.

What is claimed is:
1. A capacitive physical quantity sensor comprising:
   first and second variable capacitors, each including a movable electrode and a fixed electrode facing each other, capacitances of said first and second variable capacitors varying in accordance with a physical quantity on said movable electrodes;
   signal generation means for periodically supplying carrier signals to said fixed electrodes to measure variation in differential capacitance of said first and second variable capacitors at a first period in a measuring mode and at a second period in a self-diagnostic modes and generating a displacement signal for displacing said movable electrodes at said second period in said self-diagnostic mode; and
   a signal processing circuit including:
      a C-V conversion circuit for converting a charge signal indicative of said differential capacitance into a voltage signal; and
      a switched capacitor filter circuit for filtering said voltage signal to output a filtered voltage signal in response to a filter circuit clock signal, wherein said signal generation means further generates said filter circuit clock signal in said measuring and self-diagnostic modes at the same period, and said first period is different from said second period.

2. A capacitive physical quantity sensor as claimed in claim 1, wherein said signal generation means includes an oscillator for generating a reference clock signal;
   a counter circuit responsive to said reference clock signal for generating said filter circuit clock signal with the same dividing ratio in said measuring and self-diagnostic modes;
   a programmable counter circuit responsive to said reference clock signal for generating said sample and hold clock signal, and said carrier signals in said measuring mode and self-diagnostic mode with different dividing ratios, respectively.

3. A capacitive physical quantity sensor as claimed in claim 1, wherein said signal processing circuit further comprises a sample and hold circuit for sampling and holding said voltage signal in response to a sample and holding clock signal which is different in period from said filter circuit clock signal.

4. A capacitive physical quantity sensor as claimed in claim 3, wherein said signal generation means further generates said sampling and holding clock signal and said filter circuit clock signal and further includes synchronizing means for synchronously outputting said sampling and holding clock signal and said filter circuit clock signal.

5. A capacitive physical quantity sensor as claimed in claim 4, wherein said signal generation means includes a programmable counter circuit for generating said carrier signals and said sampling and holding clock signal at said first period and said second period in said measuring and self-diagnostic modes, respectively.

6. A capacitive physical quantity sensor as claimed in claim 1, wherein said signal processing circuit further comprises a sample and hold circuit for sampling and holding said voltage signal in response to a sample and holding clock signal of which period is different between said measuring and self-diagnostic modes.

7. A capacitive physical quantity sensor as claimed in claim 6, wherein said signal generation means further generates said sampling and holding clock signal and said filter circuit clock signal and further includes synchronizing means for synchronously outputting said sampling and holding clock signal and said filter circuit clock signal.

8. A capacitive physical quantity sensor as claimed in claim 7, wherein said signal generation means includes a programmable counter circuit for generating said carrier signals and said sampling and holding clock signal at said first period and said second period in said measuring and self-diagnostic modes, respectively.

* * * * *